Sept. 17, 1935.  P. SCHLEMPER  2,014,864
PILE CUTTING KNIFE
Filed July 18, 1933  2 Sheets—Sheet 1
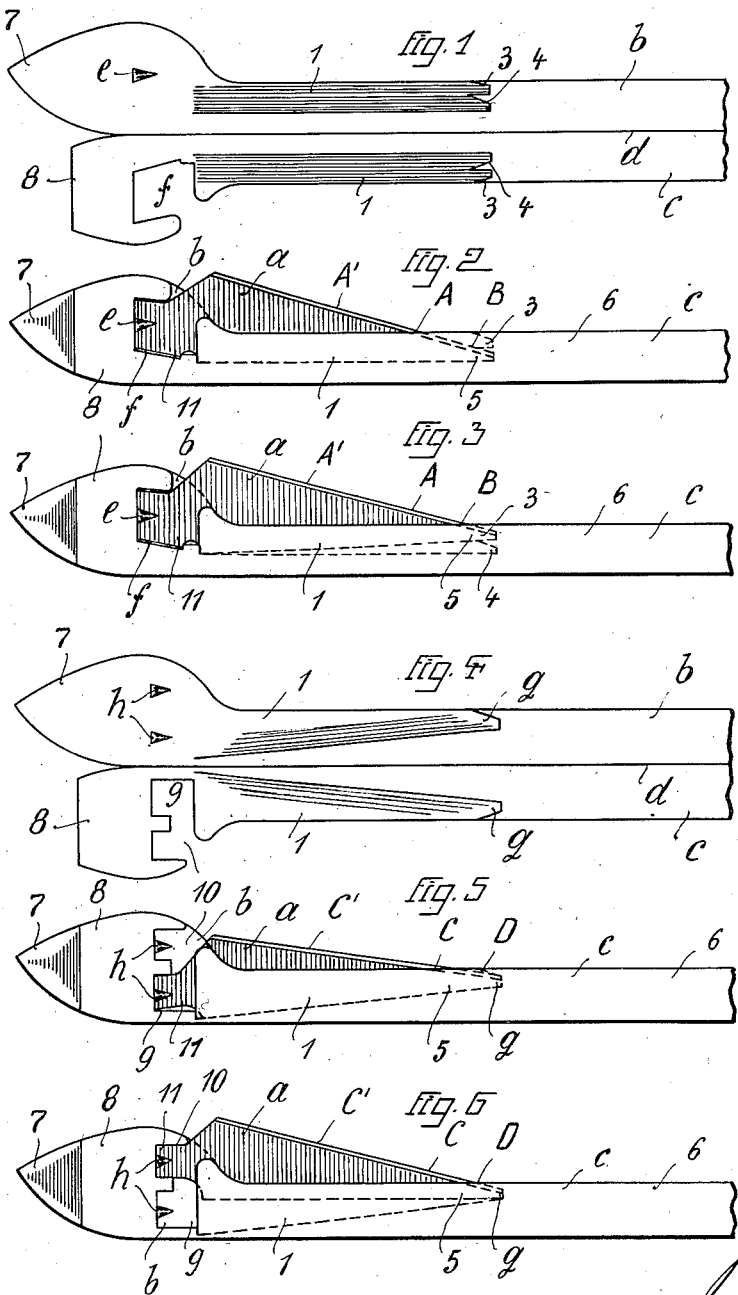

Sept. 17, 1935.  P. SCHLEMPER  2,014,864
PILE CUTTING KNIFE
Filed July 18, 1933   2 Sheets-Sheet 2
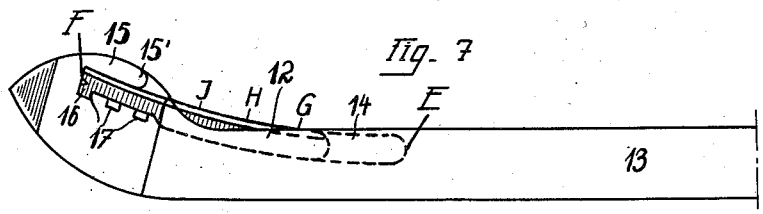
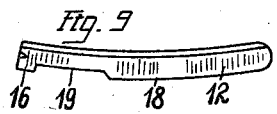
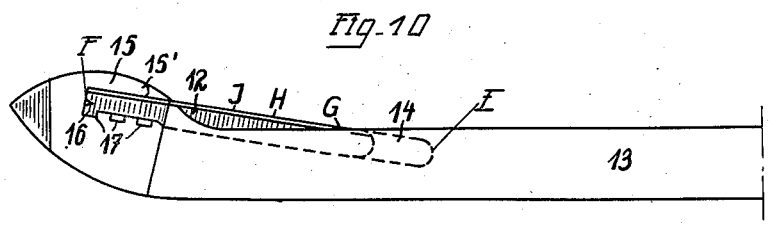

Patented Sept. 17, 1935

2,014,864

UNITED STATES PATENT OFFICE 2,014,864

PILE CUTTING KNIFE

Paul Schlemper, Solingen-Ohligs, Germany

Application July 18, 1933, Serial No. 681,016
In Germany September 17, 1932

5 Claims. (Cl. 139—44)

This invention relates to pile cutting knives or rods such as are used in the manufacture of velvets and the like.

In the construction of pile cutting rods or knives provided with interchangeable blades, it is common to rearrange the blade in the rod in order to prolong its effective lifetime. But blades for this purpose have heretofore been provided with two cutting edges, which naturally requires a considerable amount of extra work during the manufacture of the blade. Moreover, the blade of the known device when rearranged no longer serves as a cutting knife proper but as a ripping hook, and the projecting point of such a blade is apt to injure the pile threads as well as to be dangerous for the operator of the device. Furthermore, the cutting edge can easily be damaged when it is not in working position.

Contrary to this, the present invention provides a blade arrangement which is made to do an increased amount of service without the necessity of providing it with two edges. The present invention is based on the fact that the blade which cuts the pile loops of the carpet and which is sharpened along its entire edge is nevertheless worn out only at the small section nearest to the upper edge of the rod, while the greater portion of the cutting edge is not used at all. It is in order to utilize this hitherto unused but sharpened portion of the edge that the present construction has been invented.

According to the present invention, the blade is made adjustable by pivotally mounting it at either its front end or its rear end. In order to adjust the blade around its front end there has been provided in the rod two stops for the rear end of the blade, of which one is located underneath the other. In order to adjust the blade around its rear end, one of the two closely adjoined walls of the double-walled rod is provided at its front or head portion with two recesses vertically spaced and corresponding in shape to the head portion of the blade, thus also constituting stops for said blade.

Through the aforesaid forms of construction, it is possible to adjust the blade in the rod head in two different positions, with the result that two different sections of the cutting edge may be used. But in order to adjust the blade in more than two positions, there is provided another form of construction, wherein the blade is arranged for longitudinal displacement in a recess of the rod. For this purpose, the blade is provided at its front end with a projecting portion, which portion is shaped and adapted for engagement in a plurality of recesses alined in a row in the head of the rod. In this way, it has been made possible to adjust the blade without even taking it out of the rod.

In order to insure that the angle of adjustment of the blade remains the same in all positions, and that the blade in all of its positions securely rests upon the bottom of the longitudinal recess, the blade is provided with parallel edges, and the blade may preferably be curved to form the arc of a circle in which case naturally also the recess must be shaped accordingly. In order to avoid an unnecessary loss of material during the manufacture of the blade, the aforesaid projecting portion at the front end of the blade should preferably be arranged in line with the back of the knife. The recess between the projecting portion and the back of the blade preferably corresponds in length to the length of the recess in the rod head.

In describing the invention in detail, reference will be had to the accompanying drawings forming part of this application, wherein like characters denote corresponding parts in the several views, and in which—

Figure 1 is a plan view of the head end of the blank from which the rod or blade holder is formed, in one form of the invention;

Figure 2 is a side elevation showing the assembled rod and blade in one position of the latter;

Figure 3 is a view similar to Figure 1, but showing a second position of the blade;

Figure 4 is a view similar to Figure 1 but showing a modified form of blank;

Figure 5 is a side elevation showing the modified form with the rod and blade assembled and the blade in one position;

Figure 6 is a view similar to Figure 5 but with the blade in a second position;

Figure 7 is a side elevation showing a second modification of the rod and blade;

Figure 8 is a plan view of the form shown in Figure 7;

Figure 9 is a detail view of the blade used in the second modification;

Figure 10 is a side elevation of a third modification of the rod and blades; and Figure 11 is a detail view of the blade used with this third modification.

In the form of invention shown in Figures 1 to 6, the pile cutter comprises a wedge shaped knife $a$ which is mounted in a rod or holder, stamped from a single piece of sheet metal to form side portions $b$ and $c$ which are united along a fold line $d$. Each of these portions is widened at one end to form a head as at 7 and 8 and the body of each side is offset as at 1 so that, when folded to form a holder 6 having a groove in its upper edge to receive the knife blade a.

In Figures 1 to 3, the rear end of each offset portion is stamped to provide vertically spaced recesses 3 and 4 so that, when the blank is folded these recesses come together to form pockets for the selective reception of the pointed end 5 of the blade a. The head part 7 is provided with a stamped recess e which cooperates with a suitable notch formed in the end edge of an extension 11 of the blade to permit a pin point to be used in lifting out the blade. The extension 11 fits loosely in a notch f formed in the part 8. In this form, the blade is initially positioned with the point 5 in the pocket 4 as in Figure 2 and most of the cutting is accomplished by the part of the edge from A to A'. When this part becomes dull, it is merely necessary to move the point 5 up into the pocket 3 whereupon the sharp unused edge portion of the blade from A to B will be positioned to effect the cutting.

In the form shown in Figures 4 to 6, the end of each offset portion 1 is provided with but a single recess g to receive the blade point 5 while the head part 7 is provided with two vertically spaced recesses to be selectively engaged by the blade extension 11, the head part 8 being provided with notches 9 and 10 to cooperate with a notch in the extension accordingly as it is engaged in one or the other. In this form, the lower recess is primarily engaged by the extension as in Figure 5 so that the edge portion C, C' does the cutting. When this part is dulled, the extension 11 is shifted to engage the upper recess and the unused and sharp edge portion C—D is exposed to effect the cutting.

It is of course understood that the knife or blade need not necessarily be arranged first in the position shown in Figure 2 or Figure 5 but might just as well be arranged first in the positions of Figure 3 or Figure 6 whereupon when the respective cutting places have been worn out, the change of positions will take place.

In the forms of construction illustrated in Figures 7 to 11, the knife blade 12 rests in the recess 14 provided in the rod 13. The recess 14 extends from E to F and at its front end the blade is secured in position by means of the overlapping part 15 which latter is provided with a rounded end portion at 15' to facilitate the insertion and removal of the knife blade. At its lower front end, the knife blade is provided with the projecting portion 16 which, according to the position of the knife blade, engages one of the recesses 17 in the bottom of the recess 14. In order to have the projecting portion 16 in line with the back portion 18 of the knife blade, the latter has been provided with the recess 19. When the blade 12 is arranged in the recess 14 in such manner that the projecting portion 16 successively engages the first, second, third, etc. recess 17 of the rod head, the sections G, H, I of the cutting edge are one after the other moved into working or cutting position.

The recesses 14 and the knife blade 12 may be curved as in Figures 7 to 9 or straight as in Figures 10 and 11.

In every form it is to be noted that the blade is adjustable in the rod to move selected edge portions of the blade into pile cutting position and that means are provided to hold the blade in such selected positions.

There has been thus provided a simple and efficient device of the kind described and for the purposes specified.

I claim:

1. In a pile cutter, a rod having a knife blade receiving recess, a knife blade having an edge and movably mounted in said recess to enable selected portions of said edge to be moved into pile cutting position, and means to hold said blade in adjusted position, said means including coacting interengaging elements on the rod and blade with the interengaging elements of the rod in spaced relation.

2. In a pile cutter, a rod having a knife blade receiving recess, a knife blade having an edge and mounted in said recess, one end of said blade being pivotally supported, and means at the remaining end of said blade for receiving the last mentioned end in selected positions, said means including vertically spaced pockets in which said remaining end is adapted to fit.

3. In a pile cutter, a rod having a knife blade receiving recess formed therein, a knife blade adjustably mounted in said recess for movement longitudinally thereof, said recess being arranged to hold the blade with a portion only of its edge exposed and the movement of the blade effecting exposure of selected portions of said edge, and means to hold the blade in adjusted position, said means including a pair of recesses in the rod spaced one above the other and a lug projecting from the knife and engageable in said recesses selectably.

4. In a pile cutter, a rod having a knife blade receiving recess formed therein, a knife blade adjustably mounted in said recess for movement longitudinally thereof, said recess being arranged to hold the blade with a portion only of its edge exposed and the movement of the blade effecting exposure of selected portions of said edge, the bottom of said recess being provided with a plurality of small spaced recesses, and a lug on said blade adapted for selective engagement with said small recesses whereby to hold the blade in adjusted position.

5. In a pile cutter, a rod having a knife blade receiving recess formed therein, a knife blade adjustably mounted in said recess for movement longitudinally thereof, said recess being arranged to hold the blade with a portion only of its edge exposed and the movement of the blade effecting exposure of selected portions of said edge, the bottom of said recess being provided with a plurality of small spaced recesses, a lug on said blade adapted for selective engagement with said small recesses, and means on said rod to prevent said lug from accidental displacement from the recess wherein it is seated.

PAUL SCHLEMPER.